United States Patent [19]

Takagi

[11] Patent Number: 4,973,017
[45] Date of Patent: Nov. 27, 1990

[54] LOCKING MECHANISM FOR A TRAY OF AN AUTOMOTIVE SEAT

[75] Inventor: Genjiro Takagi, Akishima, Japan

[73] Assignee: Tachi-S Co., Ltd., Tokyo, Japan

[21] Appl. No.: 373,957

[22] Filed: Jun. 30, 1989

[51] Int. Cl.[5] .............................................. E04G 3/00
[52] U.S. Cl. .................................... 248/293; 297/113; 297/146; 292/254
[58] Field of Search ...................... 248/293, 291, 311.2; 297/112, 113, 115, 191, 146; 292/254

[56] References Cited

U.S. PATENT DOCUMENTS

| | | | |
|---|---|---|---|
| 2,132,279 | 10/1938 | Wicknick et al. | 297/146 |
| 2,167,324 | 7/1939 | Roberts | 292/254 |
| 2,240,748 | 5/1941 | Bak | 297/113 |
| 2,588,307 | 3/1952 | Meer et al. | 292/254 X |
| 2,793,894 | 5/1957 | Modes | 292/254 X |
| 2,824,599 | 2/1958 | Quinlan | 297/113 X |
| 3,183,027 | 5/1965 | Powers | 292/254 X |
| 3,467,425 | 9/1969 | Ferrara | 297/146 X |
| 3,811,719 | 5/1974 | McBurnie et al. | 292/254 |
| 3,926,473 | 12/1975 | Hogan | 297/115 |
| 4,533,175 | 8/1985 | Brennan | 297/113 X |

Primary Examiner—David M. Purol
Attorney, Agent, or Firm—Browdy and Neimark

[57] ABSTRACT

A locking mechanism for a tray of an automotive seat, in which the seat is formed with a recess and the tray is rotatably secured in the recess, includes a lock lever secured rotatably on the tray and a lock rod provided in the recess in a manner projectable or retractable therefrom or thereinto. Simply rotating the lock lever releases the tray from the locked state, and simply pressing the tray back into the recess or opening causes the lock rod to lock the tray into a non-use position.

5 Claims, 3 Drawing Sheets

LOCKING MECHANISM FOR A TRAY OF AN AUTOMOTIVE SEAT

BACKGROUND OF THE INVENTION

1. Field of the Invention

The present invention relates to a locking mechanism for a tray used in an automotive seat, on which a cup, a bottle of or canned beverage, or other small articles is placed, and is particularly directed to a locking mechanism for locking and unlocking an armrest tray of the type accessible from the recessed area in the seat back of the seat, wherein the tray is rotatatively drawn out or returned into the recessed area so as to be placed upon the armrest for use or stored in a non-use sate in the seat, or such an armrest tray of the type used in a trunk-through rear seat, in which the tray is rotatably provided in in the trunk-through opening of the seat leading to the interior of the trunk room of the automobile and when in use on the armrest, the tray acts as a protector plate for protecting the upper surface of the arm rest against such a long article as a ski sled or the like, or if not so, the tray is used as it is for some cups or canned beverage to be placed thereon, and when in no use, the tray is strored in the trunk-through opening, serving as a wall that partitions the seat side and trunk room.

2. Description of Prior Art

As stated in the field of the invention above, there has been known an armrest tray of the type accessible from the recessed part of seat or of the type used in a trunk-through rear seat. In both two types of trays, the tray is rotatably drawn out for use on the armrest or returned into the seat for non-use stored position. The tary is locked or unlocked by means of a locking mechanism in order to cause it into the non-use state or release it from the locked state for the use state.

To assure the locking and unlocking of the tray, the action of the locking mechanism therefor reqruires a rapidity and ease in terms of its operationability and thus it has been desired that the locking/unlocking action should be effected simultaneously with the drawing-out/returning of the tray.

Meeting such demand, a magnetic force has been received attention to effect locking or unlocking of the tray, and there has been made available a magnetic automotive-tray locking mechanism, according to which, for instance, a magnet is provided at the tray-storage area of the seat while a metallic piece is provided at the tray, so as to effect a positive locking of the tray when returning it to the non-use storage area of the seat. At the locking, the tray is magnetically attracted and secured to the seat by the reason that the metallic piece of the tray is forcibly attached to the magnet of the tray-storage area of the seat. Reversely, when its unlocking is desired, the tray is drawn out from that storage area, overcoming the magnetic force exerted between the magnet and metallic piece, so that the tray is rotated down to rest on the armrest for use.

However, a drawback has been found with such conventional magnetic tray locking mechanism, in that the locked state of the tray is easily released under an "inertia" force which is produced in the repeated increase and decrease of the driving speed of the vehicle, such as an automobile, train, bus or airplane, thus raising the possibility of the stored tray being unexpectedly thrown out into a usestat, presenting an undesired trouble on the part of an occupant on the seat.

Even if a magnet of increase magnetic force is utilized in the locking mechanism to prevent such unexpected unlocking of the tray, there will be such an inconvenience that a much more force is required by the occupant who intends using the tray to overcome the increased magnetic force, thus deteriorating the unlocking operation.

SUMMARY OF THE INVENTION

It it a purpose of the present invention to provide a locking mechanism for automotive-seat tray which is improved in the locking/unlocking operation thereof.

In achievement of the purpose, the present invention comprises a tray which is rotatably attached in the recess or opening of a seat back, a lock rod provided in that recess, such that it is disposed at the upper side of the recess and normally biased by springs in a downward direction so as to be elastically projectable threfrom and retractable thereinto, and a lock lever secured rotatably to the tray, the lock lever being in a contacting lock/unlock relation with the lock rod.

Accordingly, when not in use, the tray is locked against rotation and stored in the recess, by virtue of the lock lever at the tray being latchingly engaged with the lock rod at the recess, but when in use, the lock lever is rotated forward with a finger to release its locked relation with the lock rod, and the tray is then rotated out of the recess towards a use position. Reversely, when it is desired to return the try to the non-use position in the recess, the tray is rotated upwards and pressed into the recess, so that the lock lever presses up the lock rod and passes by it, overcoming the downward biasing force of the springs associated with the lock rod, after which the lock rod is again lowered and projected in front of the lock lever, whereby the tray is placed in a locked state and prevented by the lock rod against rotation towards the use position. Thus, the unlocking or locking of the tray is easily carried out by simply hooking up the lock lever or pressing the tray per se into the recess of seat back, without any other locking operation.

BRIEF DESCRIPTION OF THE DRAWINGS

Fig. 5(B) is an explanatory sectional view which shows the state in which the tray is being released from the locked state and rotated towards a use position.

DETAILED DESCRIPTION OF PREFERRED EMBODIMENT OF THE INVENTION

Figure 1:
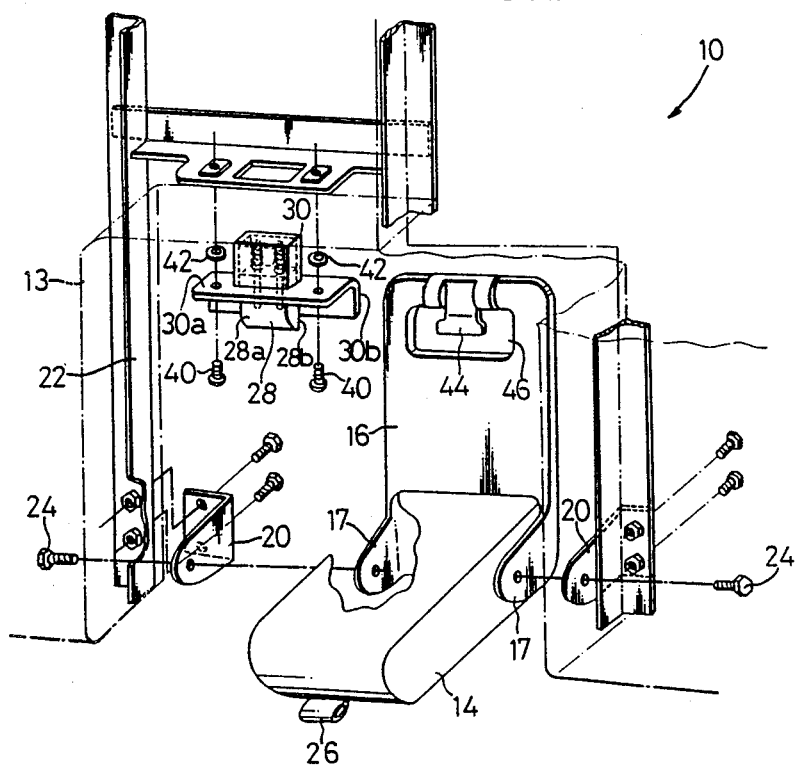
FIG. 1 is an exploded perspective view of a locking mechanism for automotive-seat tray in accordance with the present invention.
Figure 2:
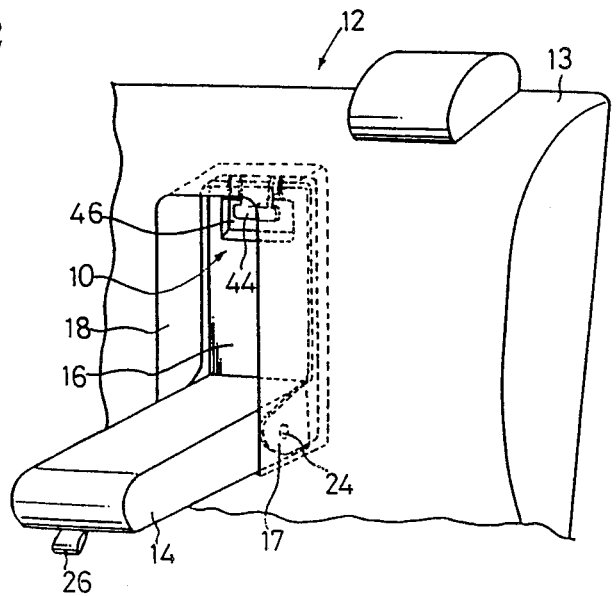
FIG. 2 is a partly broken perspective view of a rear seat in which is provided the locking mechanism of the prevent invention.

Referring to FIGS. 1 and 2, there is illustrated a locking mechanism (1) for an automotive-seat tray (16) in accordance with the present invention, in which the tray (16) is rotatable around the point same with the rotation center of an armrest (14).

As shown, both tray (16) and armrest (14) are provided at the recessed area (18) (or it may be formed as a trunk-through opening in the case of a trunk-through rear seat) which is formed in the frontal surface of the seat back (13) of a rear seat (12), and the tray 16 and armrest 14 are rotatable at the axis (24) forwardly and backwardly from and towards that recessed area (18). Thus, when in use, the armrest (14) drawn out to a use horizontal position and the tray (16) rests on the armrest, functioning as a tray upon which to some small articles such as a cup or bottle of beverage are to be placed.

Specifically, the tray (16) is formed with a pair of support legs (17)(17) at its lower end in an intergral manner, and a pair of brackets (20)(20) are fixed on the respective lateral bar sections of a frame (22) which circumscribes the square-like armrest storage recess (18). Both support legs (17) (17) and brackets (20)(20) have co-axially aligned holes perforated therein, as seen in the figures, through which holes two securing bolts (24)(24) are inserted loosely and fixed threadedly into the respective lateral sides of the armrest (14), whereupon it is seen that the tray (16) is supported in a co-axially rotatable relation with the armrest (14) and free to vertically rotate above the armrest (14).

FIGS. 1 and 2 show the armrest (14) to be in the use position, extending forwardly from the seat (12) on a horizontal line, after having been drawn out from the armrest storage recess (18). Numeral (26) denotes a cloth lug fixed on the upper end of the armrest (14). This lug (26) is to be pulled forward when drawing out the armrest (14) from its non-use position in the recess (18) to a use position on the armrest (14).

Figure 3:
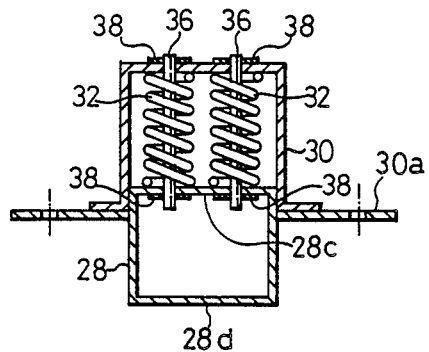
FIG. 3 is a sectional view of a lock rod and lock casing associated with the locking mechanism.

The tray locking mechanism (10) includes a lock rod (28) which is slidably accommodated in a lock casing (30) and biased downwardly by a pair of springs (32)(32) so as to normally project from the lock casing (30). In FIG. 1, the lock casing (30) is formed with a securing plate section (30a) as well as a stopper plate section (30b) dependent therefrom. The securing plate section (30a) is fixed to the upper bar section of the frame (22) by means of screws (40) (40) and washers (42)(42), and thus the lock rod (28) is fixed at the upper side of the armrest storage recess (18) and disposed in the armrest storage recess (18). As best shown in FIG. 3, the lock rod (28) is biased in a downward direction by a pair of springs (32)(32) which are wound around the two support rods (36)(36) respectively, the support rods (36)(36) being at their upper ends secured to the top of the lock casing (30) via E-shaped rings (38)(38) and at their lower ends slidably inserted through the upper base part (28b) of the lock rod (28). The lower ends of the support rods (36)(35) are also firmly attached by the E-shaped rings (38)(38) to prevent the lock rod (28) against removal from the lock casing (30). As can best be seen in FIGS. 4(A) to 4(C), the lock rod (28) is formed with a cambered frontal surface (28c) and rear vertical surface (28d).

With this construction, the lock rod (28) is normally kept projected from the upper side of the armrest storage recess (18) and retractable into the lock casing (30).

The locking mechanism (10) further includes a lock lever (44) which is rotatably provided at the upper free end portion of the tray (16). The lock lever (44), as best illustrated in FIGS. 4(A) and 4(B), is comprised of an upper base section (44a) and a lower handle section (44b), such that the former (44a) has, defined at its frontal surface, a flat recessed area (44a-1) between a pair of protrudent parts (44a-2)(44a-2) and further at its rear side a cambered rear surface (44a-2), with an abutment projection (44) formed at the lower end thereof, whereas the latter (44b) extends downwards continuously from such upper base section (44a), the formation of which is such that a cut-away part (44b-1) is formed at the inner surface thereof, defining a recess in which an operator's finger (50) (see Fig. 5(B)) is hookingly inserted, thereby making it easier for the operator to touch and rotate the lock lever (44) in an assured way.

It is noted here that the foregoing flat recessed area (44a-1) is slightly greater in width than the lock rod (28) so that the lock rod (28) is slidable on and along the flat recessed area (44a-1).

Figure 4A:
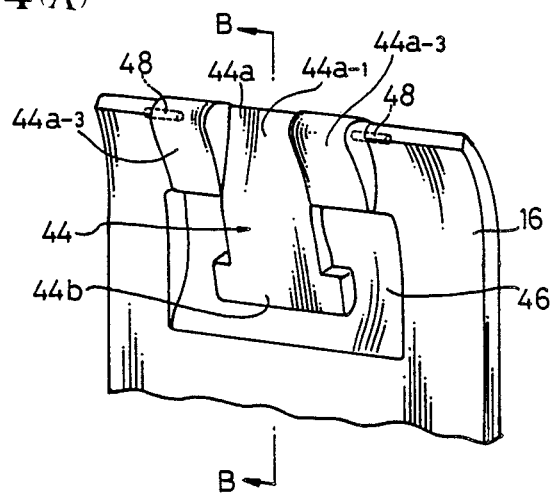
Fig. 4(A) is a perspective view of a lock lever which is provided at the tray.
Figure 4B:
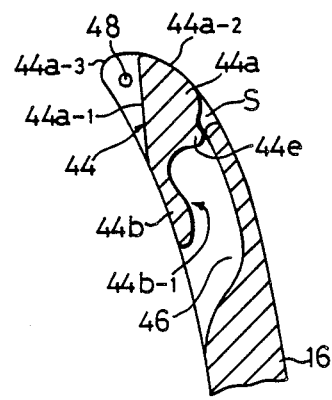
Fig. 4(B) is a sectional view taken along the line B—B in the FIG. 4(A)

Referring now to FIGS. 4(A) and 4(B), it is seen that the top edge of the tray (16) is partly cut away at its midway area to provide a cut-away part (s), and in the same tray (16), there is formed a recessed part (46) adjacently beneath the cut-away part (s). As shown, the upper base section (44a) the lock lever (44) is rotatably secured in the cut-away part (s) by two pins (48)(48), and the lower handle section (44b) of the same lock lever (44) is normally situated within the recessed part (46). As seen in FIG. 4(B), in a normal state, the abutment projection (44e) of the lock lever (44) is abutted against the upper end of the recessed part (46), limiting the rearward rotation of the lock lever per se, with the flat recessed area (44a-1) presenting a vertical surface on the same vertical line with the rear vertical surface (28d) of the lock rod (28). In this connection, therefore, when the tray (16) is locked by the lock lever (44), the flat recessed area (46) of the lock lever (44) is in a close contact with the rear surface (28d) of the lock rod (28) whereupon the forward rotation force (F), which is created by an inertia force due to a deceleration, is positively eliminated.

Figure 5A:
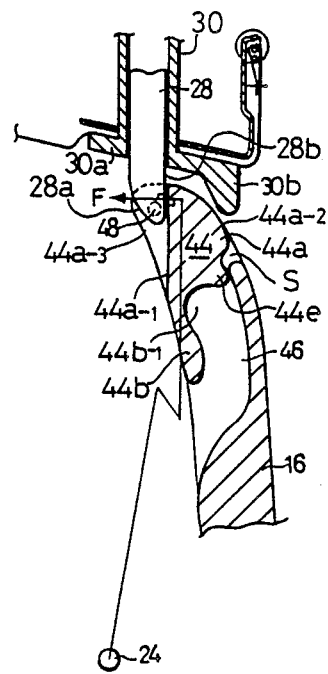
FIG. 5(B) is an explanatory sectional view which shows the state in which the tray is locked at a non-use position.
Fig. 5(C) is an explanatory section view which shows the state in which the tray is being returned to and locked at the non-use position.

Preferably, as in FIG. 5(A), the top portion of the tray (16) is gently curved in a forward direction to thereby dispose the flat recessed area (44a-1) of the lock lever (44) at a point forward of the tray (16), and the lower handle section (44b) of the lock lever (44) is bent towards the tray (16) so as to be flush with the surface of the tray (16). This is effective in forming the tray (16) in a shape conforming to the upper surface of the armrest (14) and thus permits the tray (15) to be placed upon the armrest (14) without interference and wobbling.

Referring to FIG. 5(A), the tray (16) is shown as being in a locked state by the presence of the lock rod (28) against the forward rotation of the tray (16). In other words, the flat recessed area (44a-1) of the lock lever (44) is against the rear vertical surface (28b) of the lock rod (28), and therefore, the lock rod (28) prevents the tray (16) from being rotated forwardly about the bolts (24).

As can be seen, the rearward rotation of the tray (16) is limited by the stopper section (30b) associated with the lock casing (30).

Accordingly, the lock lever (44), by the reason of its recessed vertical area (44a-1) fully contacting the rear vertical surface (28b) of the lock rod (28), lets out an inertia force (F), which occurs in the deceleration, causing the unlocking of the lock lever (44), in a direction to intersect the vertical contact line between the two surfaces (44a-1)(28b), whereby the inertia force (F) is directly received by the lock rod (28) and thus no vertical component force is produced from the interia force (F) which will move the lock rod (28) upwardly against the downward biasing force of the springs (32)(32). As such, the tray (16) is assuredly prevented against unlocking from the lock rod (28).

Figure 5B:
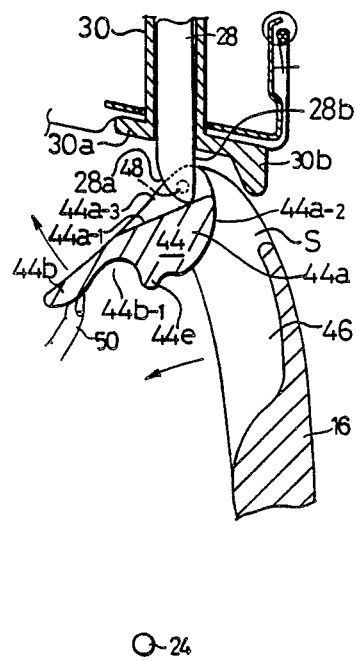

When it is, on the contrary, to release the tray (16) from such locked state for use, an operator inserts his or her finger (50) behind the lock lever (44), having it hooked on the lower handle section (44b) of the lever (44) and rotate the lock lever (44) forwardly about the pin (48). Then, the 15 flat recessed area (44a-1) of the lock lever (44) is also rotated about the top tip of the lock rod (48), as shown in FIG. 5(B), presenting a generally horizontal surface with respect to the vertically dependent lock rod (28), or strictly speaking, presenting a surface inclined at an angle generally indentical to the forward rotation direction indicated by the arrow, with respect to the lock rod (28). As a result thereof, a point contact is established between the lock rod (28) and lock lever (44), allowing for easy slidability of the lock lever (44) along the lock rod (48).

Then, adding further a forward force with the finger (50) to the lock lever (44), the tray (16) is rotated forwardly in the arrow direction as in FIG. 5(B), with the top tip of the lock rod (28) being in a slidable point contact with the flat recessed area (44a-1) of the lock lever (44). In that way, the tray (16) is released from the locked state as in FIG. 5(A) and rotated forwardly out of the armrest storage recess (18) towards a use position upon the amrrest (14) which has been set at a horizontal use position as shown.

In this context, it is added that an operator has only to shortly operate the lock lever (44) to release its locking engagement with the lock rod (28) because after that simple operation the tray (16) is caused to rotate forwardly with its won weight to rest on the armrest (14).

Figure 5C:
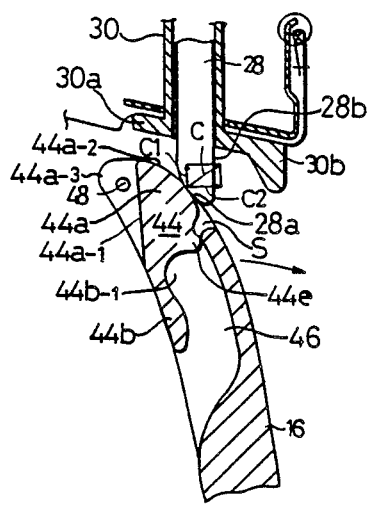

When the tray (16) is not used, it is rotated upwardly towards the armrest storage recess (18). By referring to FIG. 5(C), as the tray (16) reaches the lock rod (28) in the arrow direction, the cambered rear surface (44a-2) of the lock lever (44) is brought to contact with the cambered frontal surface (28a) of the lock rod (28), at which point, a rotation force (c) is being given at such outwardly arched rear surface (44a-2), thus producing two different vertical and horizontal component forces (C1)(C2). Since the vertical component force (C1) is oriented in a direction opposing the downward direction of the lock rod (28), as the operator forcibly presses the tray (15) further into the armrest strorage recess (18), the vertical component force (C1) is transmitted to the similarly arched surface (28a) of the lock rod (28), overcoming the downwardly biasing force of the springs (32)(32), and then, the lock rod (28) is moved upwardly and retracted into the lock casing (38), allowing the slidingly passing of the lock lever (44) along the top surface of the lock rod (28). Consequently, the lock rod (28) rides over the top of the lock lever (44) and is lowered therebehind by the biasing force of the springs (32)(32), thereby placing the tray (16) in the locked state as shown in FIG. 5(A).

From the above description, it is appreciated that, according to the present invention, the tray (16) is drawn out to a use position by simply hooking up the lock lever (44) with a finger for its unlocking, and can be renturned to a non-use position in the armrest storage recess (18) by simply pressing the tray (16) threinto, without any further looking operation. Moreover, the tray (16), when locked, is positively prevented from being accidentally unlocked due to an inertia force in a deceleration case, by virtue of the full contact between the lock rod (28) and lock lever (44) on a vertical line.

While having described the invention as above, it should be understood that it is not limited to the illustrated embodiment, but various other modifications, replacements and additions may be structurally possible without departure from the scopes and sprits of the appended claims.

What is claimed is:

1. A locking mechanism having a locked state and unlocked state for locking a tray to an automotive seat, in which said seat is formed with a recess having edges therein and said tray is at one end rotatably connected to said recess, thereby allowing said tray to be stored therein and drawn out therefrom, comprising:

a lock lever which is rotatably connected to a free end of said tray at a center of rotation; and a lock rod provided in said recess or opening, said lock rod being biased by a spring means in a direction projecting from said recess opening and being adapted to be latchingly engageable with said lock lever;

wherein, said tray is locked in said recess when said lock lever is engaged with said lock rod, and rotatively operates said lock lever to release said tray from a said locked state by said lock rod;

wherein said lock ever has a flat surface at its frontal side presenting a frontal vertical flat surface and a cambered surface at its rear side presenting an outwardly arced surface, whereby, when said tray is locked in said recess opening, said lock rod is abutted against said flat frontal surface of said lock lever, said frontal vertical flat surface of said lock rod is fully contacted with a frontal surface of said lock lever thus ensuring such locked state of said tray, and when said tray is returned into said recess or opening, said cambered rear surface of said lock lever is to be slidingly contacted with said lock rod, this allowing said tray to be easily locked in said recess or opening by simply pressing said tray thereinto;

and wherein, said lock rod frontal flat surface extends in said lock state in contact with said lock lever frontal surface to a point which is further away from one of said recess edges then said lock lever center of rotation.

2. The locking mechanism according to claim 1, wherein said recess or opening is defined at a frontal surface of said seat, and wherein said tray is at its both lateral sides rotatably connected to said recess or opening by means of pins, whereby said tray is rotatable about said pins from and into within said recess or opening.

3. The locking mechanism according to claim 1, wherein a lower portion of said lock lever comprises a cut-away part formed at its inner surface, defining a recess in which an operator's finger is to be hookingly inserted, thereby making it easy for the operator to touch with his or her one finger and rotate said lock lever in an assured way.

4. The locking mechanism according to claim 1, wherein said lock rod has springs which are provided in a lock casing such that said lock rod is elastically projectable and retractable by said springs from and into said lock casing, said lock casing having a stopper section which serves to limit a rearward rotation of said tray, and wherein said lock rod is so formed that its frontal surface is flat, presenting a frontal vertical flat surface, while its rear surface is cambered, presenting an outwardly arched surface, whereby when said tray is locked in said recess or opening, said frontal vertical flat surface of said lock rod is fully contacted with a frontal surface of said lock lever and when said tray is returned into said recess or opening, said lock rod is easily raised by said rear cambered surface of said lock lever, thus permitting said tray to be easily locked in said recess or opening by simply pressing said tray thereinto.

5. The locking mechanism according to claim 1, wherein said recess or opening is formed in a seat back of said seat as an armrest storage recess or opening, and wherein said tray is rotates about the same center as said armrest.

* * * * *